(12) United States Patent
O'Keene et al.

(10) Patent No.: US 7,963,489 B2
(45) Date of Patent: Jun. 21, 2011

(54) EXTENSION MECHANISM FOR A MOUNTING SYSTEM

(75) Inventors: Dugan O'Keene, Forest Park, IL (US); William Phuong Hong Lam, Grayslake, IL (US); Garry Monaco, Hoffman Estates, IL (US)

(73) Assignee: Peerless Industries, Inc., Aurora, IL (US)

( * ) Notice: Subject to any disclaimer, the term of this patent is extended or adjusted under 35 U.S.C. 154(b) by 526 days.

(21) Appl. No.: 11/888,984

(22) Filed: Aug. 3, 2007

(65) Prior Publication Data

US 2008/0035813 A1 Feb. 14, 2008

Related U.S. Application Data

(60) Provisional application No. 60/836,866, filed on Aug. 10, 2006.

(51) Int. Cl.
*F16M 11/00* (2006.01)
(52) U.S. Cl. ............ 248/201; 248/917; 248/924; 211/99
(58) Field of Classification Search ............... 248/298.1, 248/284.1, 917, 919, 920, 281.11, 274.1, 248/285.1, 292.13, 922, 924, 200.1, 176.1, 248/558, 448, 670, 323, 244, 241, 346.07, 248/475.1, 489, 490, 495, 496, 292.14, 294.1, 248/918, 297.31; 361/681; 211/99, 104, 211/26, 187, 190; 312/265.1, 265.2, 265.3, 312/265.4, 334.4
See application file for complete search history.

(56) References Cited

U.S. PATENT DOCUMENTS

| | | | | |
|---|---|---|---|---|
| 4,108,313 A * | 8/1978 | Bogar, Jr. | ......................... | 211/64 |
| 4,450,989 A * | 5/1984 | Bogar, Jr. | ..................... | 224/549 |
| 4,991,723 A * | 2/1991 | Elkins | ............................. | 211/64 |
| 5,069,411 A * | 12/1991 | Murphy | ........................ | 248/476 |
| 5,078,309 A * | 1/1992 | Hull et al. | ..................... | 224/482 |
| 5,833,337 A * | 11/1998 | Kofstad | ..................... | 312/334.5 |
| 6,102,348 A * | 8/2000 | O'Neill | .................... | 248/289.11 |
| 6,230,903 B1 * | 5/2001 | Abbott | ............................ | 211/26 |
| 6,402,111 B1 * | 6/2002 | Stewart et al. | ................ | 248/317 |
| 6,666,419 B1 * | 12/2003 | Vrame | ....................... | 248/200.1 |
| D493,800 S | 8/2004 | Pfister et al. | | |
| D494,596 S | 8/2004 | Pfister | | |
| 6,905,101 B1 | 6/2005 | Dittmer | | |
| 6,923,413 B2 * | 8/2005 | Dozier | ....................... | 248/294.1 |
| 6,974,037 B2 * | 12/2005 | Haney | ............................. | 211/26 |
| 7,070,156 B2 * | 7/2006 | Liao | ............................. | 248/466 |
| 7,152,836 B2 * | 12/2006 | Pfister et al. | ............. | 248/292.14 |
| 7,300,029 B2 * | 11/2007 | Petrick et al. | .............. | 248/285.1 |
| 7,316,379 B1 * | 1/2008 | Graham | ....................... | 248/298.1 |
| 7,345,870 B2 * | 3/2008 | Shin | ......................... | 361/679.27 |
| 7,438,269 B2 * | 10/2008 | Pfister et al. | ............. | 248/292.14 |
| 7,537,189 B2 * | 5/2009 | Jung et al. | ................... | 248/298.1 |
| 2006/0118685 A1 * | 6/2006 | Schluter et al. | ............... | 248/244 |
| 2007/0090250 A1 | 4/2007 | O'Keene | | |

OTHER PUBLICATIONS

Sanus Systems, "Assembly Instructions for Model: VMPL3", May 25, 2006.

* cited by examiner

*Primary Examiner* — Kimberly T Wood
(74) *Attorney, Agent, or Firm* — Foley & Lardner LLP

(57) ABSTRACT

An improved mounting system for use with display units and other devices of various sizes. A mounting system of the present invention includes a surface mounting bracket and at least one device mounting bracket. At least one of the surface mounting bracket and the at least one device mounting bracket is expandable such that it is able to accommodate and support devices of different dimensions and weights.

19 Claims, 8 Drawing Sheets

EXTENSION MECHANISM FOR A MOUNTING SYSTEM

CROSS-REFERENCE TO RELATED APPLICATIONS

The present application claims priority to U.S. Provisional Patent Application No. 60/836,866, filed Aug. 10, 2006 and incorporated herein by reference in its entirety

FIELD OF THE INVENTION

The present invention relates generally to mounting systems. More particularly, the present invention relates to mounting systems for devices such as flat panel televisions.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, flat panel televisions have become enormously popular in both commercial and residential sectors. As the prices for plasma and liquid crystal display (LCD) flat panel displays have continued to fall, and the quality for the same devices have improved, more and more businesses and individuals have purchased such devices for both home and business entertainment purposes.

One of the advantages of flat panel television units that customers have found particular appealing is their relatively low thickness. Because conventional "tube" televisions have a relatively large depth, the display options for such devices are quite limited. In the residential setting, most users require a television stand or large entertainment center to store the television. Such stands or entertainment centers can take up significant floor space, which is often undesirable. In the commercial or educational setting, users will often install large overhead mounting systems that can contain the television. However these systems usually require professional installation. With flat panel televisions, on the other hand, users are presented with a relatively new option: mounting the television directly to the wall. By mounting the television to the wall, a person can eliminate the need to take up potentially valuable floor space.

Although the introduction of flat panel televisions on a wide scale has presented new opportunities to both residential and commercial customers, it has also presented new challenges. In particular, flat panel televisions, while usually having significantly smaller depth or profile than conventional "tube" televisions, tend to be quite heavy. Particularly for flat panel televisions with large screens, this weight can become also prohibitively great. With such large weights involved, it is especially important that users can easily, safely, and securely mount the devices without having to make substantial adjustments.

A number of conventional wall mounting systems involve the use of a relatively large wall surface mounting bracket and a plurality of device mounting brackets that are configured to attach to the back of a television or other display device. Each device mounting bracket typically includes a screw or similar fastener that is used to secure the device mounting bracket relative to the wall surface mounting bracket. One such conventional device mounting bracket includes a pair of side portions which bound a mounting contact portion. An upper hook and a lower guiding portion are located on each side portion, which together define a receiving region for the wall surface mounting bracket. The upper hook is formed on each of the side portions at substantially the same position. A plurality of openings are used to connect the conventional device mounting bracket to a television or other flat panel display.

Although useful, mounting systems of the type described above include certain shortcomings. In particular, current mounting systems include device mounting brackets and wall surface mounting brackets that are sized specifically for television ranges of certain sizes. As would be understood by those skilled in the art, it is important that these components not be too small to adequately support the load of the display unit. If these components are too small, there is a substantial risk that the mounting system will not be able to support the entire load, which could lead to substantial damage to the display unit and potential physical injury to people in the vicinity of the display unit. Furthermore, it is also important that the individual mounting system components not be too large for a particular display unit, as this could result in the mounting system extending beyond the edges of the unit, which is aesthetically unpleasing.

In light of the above issues, manufacturers of television mounts have had little choice but to make multiple models of the same mounting systems, with each model being designed specifically for a particularly range of television sizes. Although this arrangement serves the need of both the manufacturer and the consumer, the necessity to manufacture multiple models of the same product adds to the complexity and cost on the part of the manufacturer, and these costs ultimately are passed onto the consumer. The existence of multiple models also increases the complexity for the installer of the mounting system, as he or she must make sure that the proper mount has been acquired for installation.

It would therefore be desirable to develop a mounting system that addresses the above shortcomings while still providing the user with a structurally sound and safe product.

SUMMARY OF THE INVENTION

The present invention provides for an improved mounting system for use with display units and other devices of various sizes. A mounting system of the present invention includes a surface mounting bracket and at least one device mounting bracket. At least one of the surface mounting bracket and the at least one device mounting bracket is expandable such that it is able to accommodate and support devices of larger dimensions and weights. In one embodiment of the invention, device mounting bracket extension members can be connected to the top and/or bottom of the device mounting brackets, resulting in the device mounting brackets being lengthened and permitting the device mounting bracket to reach farther towards the top and bottom edges of larger devices. In another embodiment, the wall plate is expandable in the left-to-right direction, permitting the wall plate to reach farther towards the right and left edges of larger devices. With these extension mechanisms, a single mounting system can be used for mounting devices of many different sizes.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
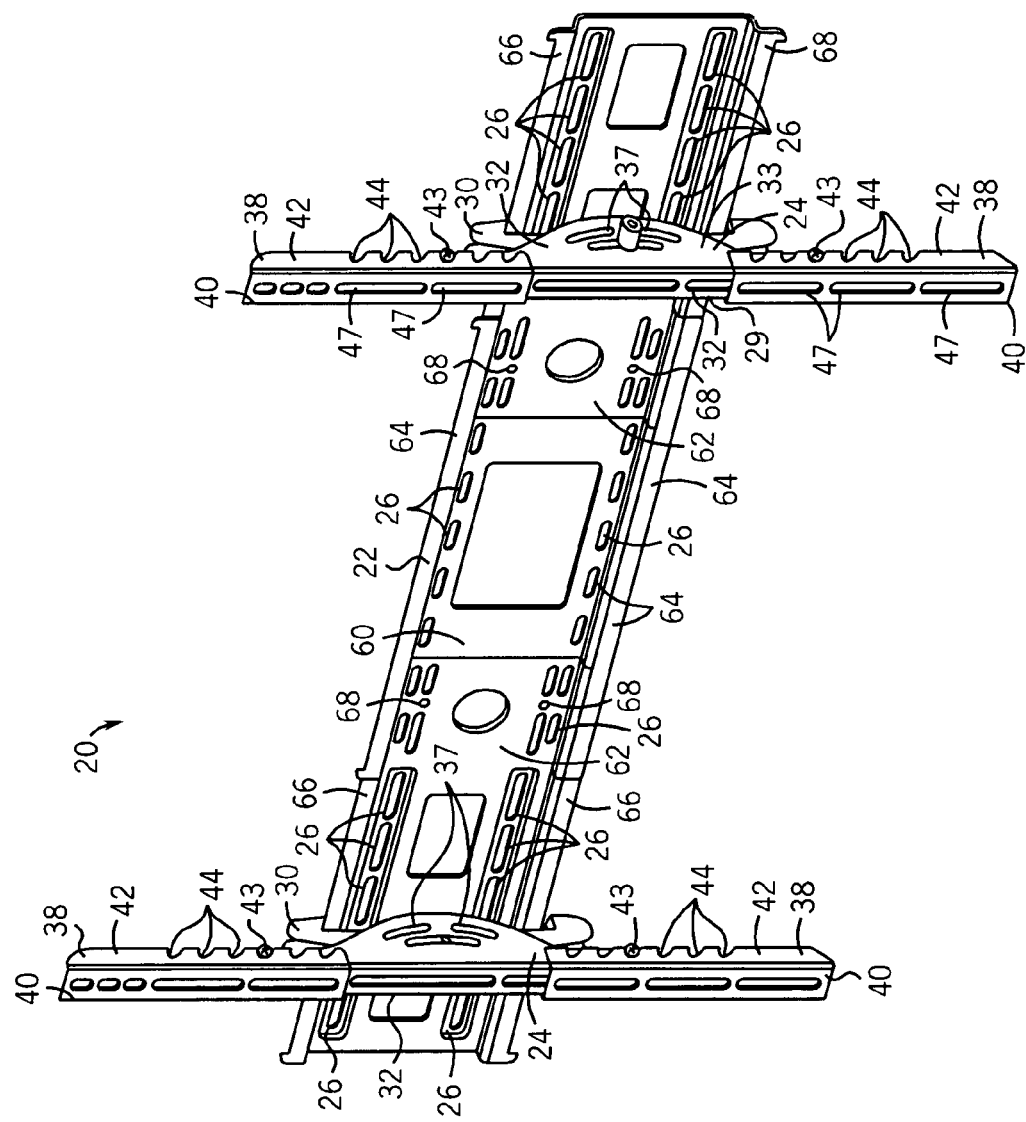
FIG. 1 is a perspective view of a mounting system constructed according to one embodiment of the present invention.
Figure 2:
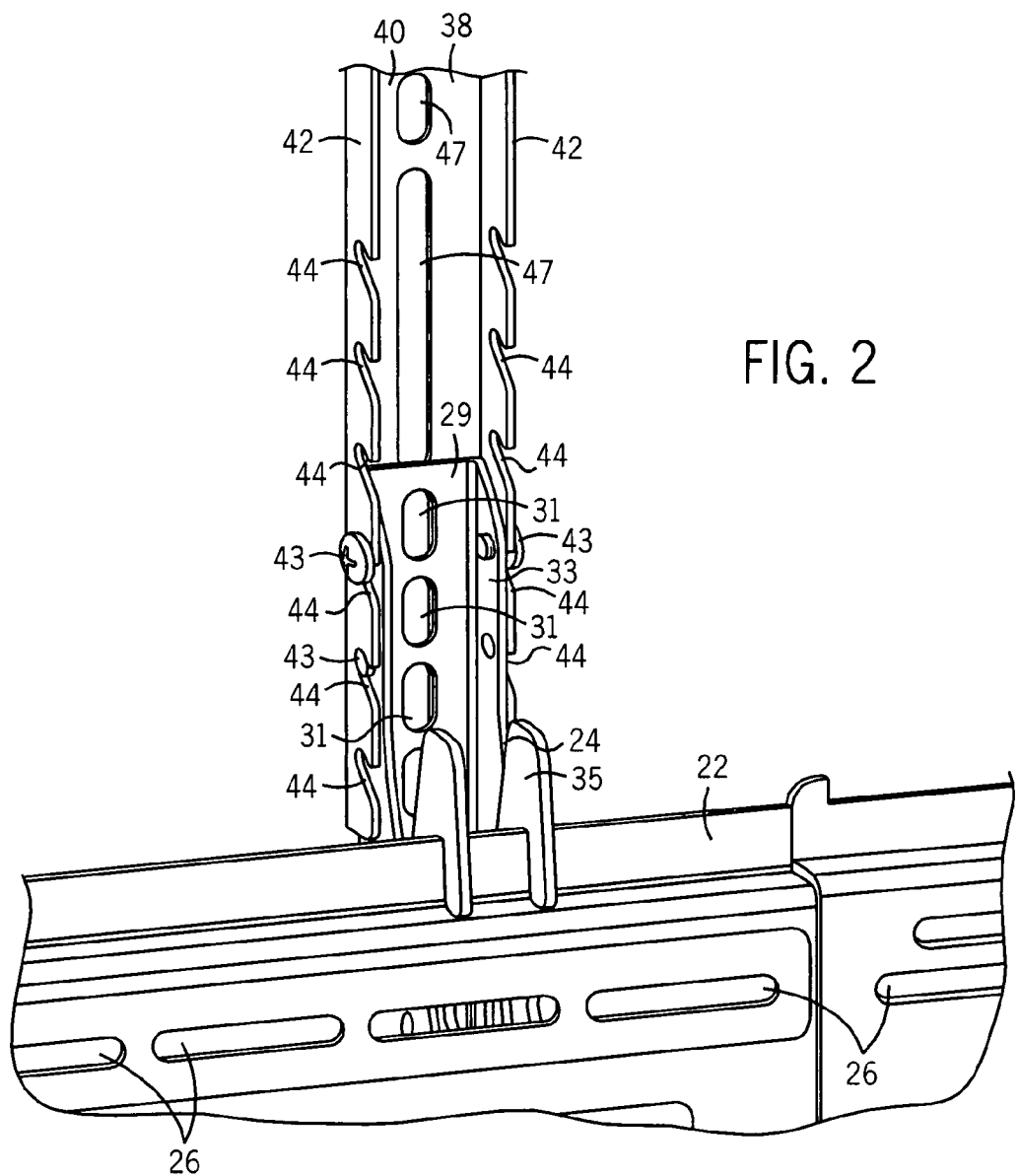
FIG. 2 is a perspective view showing the interaction between a device mounting bracket and a device mounting bracket extension mechanism in the mounting system of FIG. 1.
Figure 3:
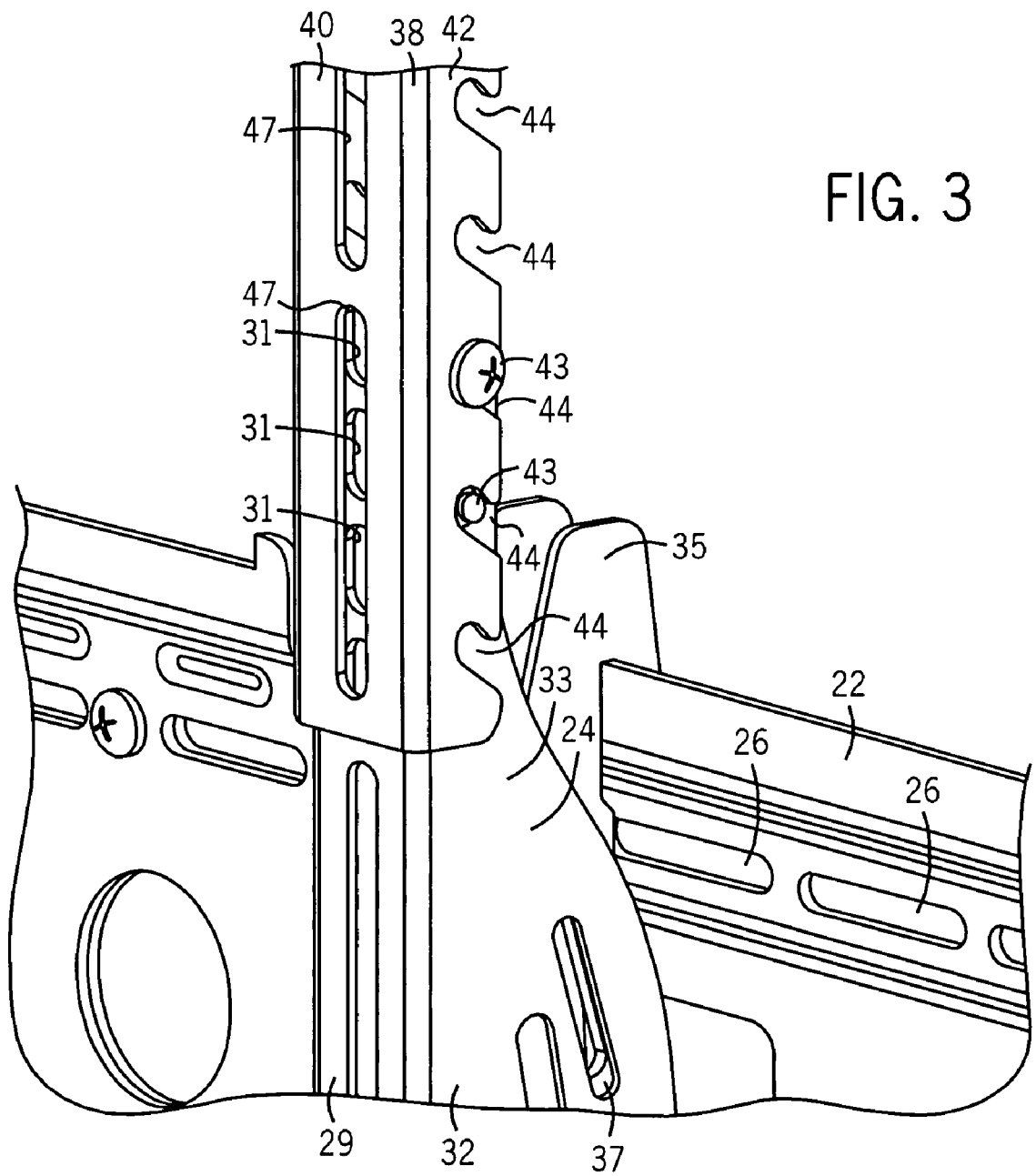
FIG. 3 is a reverse perspective view showing the interaction between a device mounting bracket and a device mounting bracket extension mechanism in the mounting system of FIG. 1.

FIG. 1 shows a mounting system 20 constructed in accordance with one embodiment of the present invention. The mounting system 20 includes a surface mounting bracket 22 and a plurality of device mounting brackets 24. In the embodiment of the invention shown in FIG. 1, two device mounting brackets 24 are used. However, virtually any number of device mounting brackets 24 may be used depending upon factors such as the size and weight of the item to be mounted. The surface mounting bracket 22 is configured to be mounted to a wall or other flat surface via a variety of surface mounting plate openings 26 and fasteners (not shown), while the device mounting brackets 24 are configured to attach to the back of a display unit such as a flat panel television. In the embodiment depicted in FIG. 1, the device mounting brackets 24 include an upper hook portion 30 for accepting an upper portion of the surface mounting bracket 22.

Figure 9:
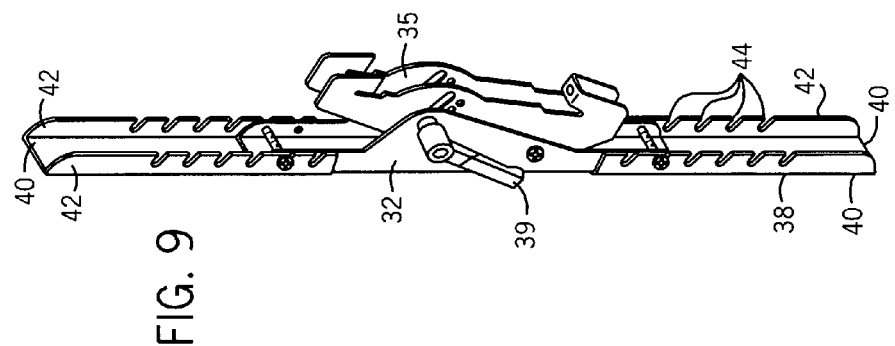
FIG. 9 is a perspective view of the arrangement shown in FIG. 7.
Figure 8:
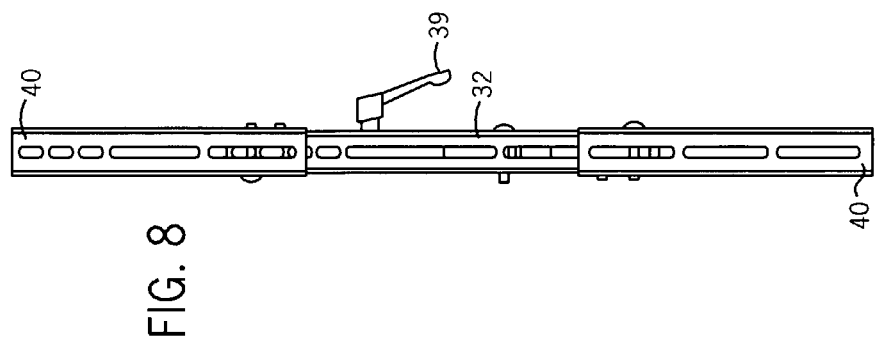
FIG. 8 is a front view of the arrangement shown in FIG. 7.
Figure 7:
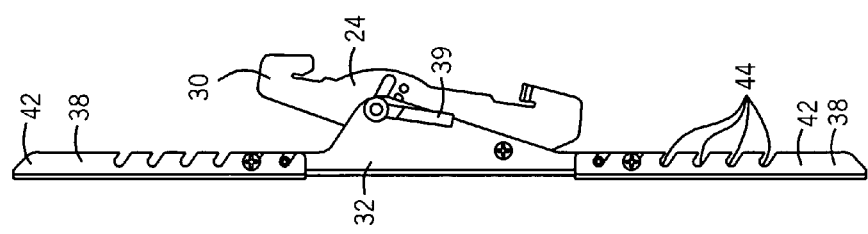
FIG. 7 is a left side view of a device mounting bracket and a device mounting bracket extension mechanism according to an alternate embodiment of the present invention.

As shown in FIG. 1, each device mounting bracket 24 includes a device contact bracket 32 and a mounting contact bracket 35. In various embodiments, the device contact brackets 32 each comprise a device contact bracket base 29 with device contact bracket flanges 33 extending therefrom. A plurality of followers (not shown) are used to couple the device contact bracket 32 and the mounting contact bracket 35 through a plurality of guide structures 37. As a result of this arrangement, the device contact bracket 32 is movable relative to the surface mounting bracket 22. In one embodiment of the invention, the guide structures 37 comprise substantially straight slots. However, other arrangements are also possible. In another embodiment depicted in FIGS. 7-9, a movable friction crank 39 may be used to selectively adjust the frictional resistance of the device mounting bracket 24 relative to the surface mounting bracket 22 and to lock the position of these components relative to each other.

The device contact bracket 32 includes an elongated upper portion 27 and an elongated lower portion 28 along a longitudinal axis thereof. The device contact bracket 32 also includes a plurality of device bracket contact slots 31 and/or holes along a longitudinal axis thereof. The device bracket contact slots 31 and/or holes are used to couple the device mounting bracket 24 with the back side of a television, display unit, or other audio/visual device via mounting holes contained thereon.

As shown in FIGS. 1-4, one or more bracket extension mechanisms 38 are removably connected to the various device mounting brackets 24 as necessary. Each bracket extension mechanism 38 includes a base portion 40 and a pair of extension bracket flanges 42. The base portion 40 includes a plurality of base portion slots 47 therein. The base portion slots 47 are sized and arranged to also align with mounting holes on the back side of the device to be mounted.

Figure 4:
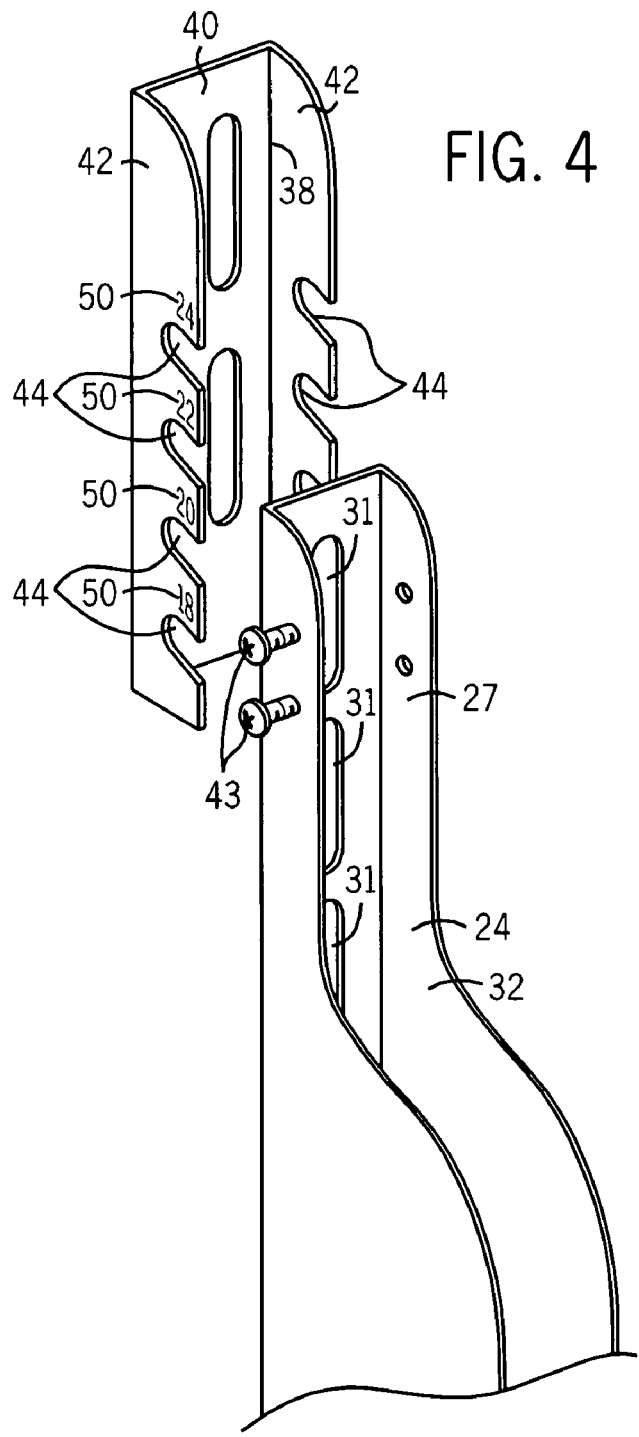
FIG. 4 is a reverse perspective view showing the device mounting bracket and the device mounting bracket extension mechanism separated from each other.

As shown in FIGS. 1-4, each extension bracket flange 36 includes a series of extension bracket slots 44 formed therein, with each extension bracket slot 44 aligning with a corresponding extension bracket slot 44 on the opposite bracket extension flange 36. The extension bracket slots 44 are configured to align with at least one projection 43 located on the elongated upper portion 27 and/or elongated lower portion 28 of the device mounting bracket 24. In various embodiments of the present invention, the projections 43 can comprise, for example, pins, screws, bolts, etc. (and combinations thereof) that are positioned within respective elongated upper and lower portions 29 and 28. In the case of screws, bolts or similar fasteners, a tightening of these components can be used to securely fasten the extension bracket flange 36 to the elongated upper portion 27 and/or elongated lower portion 28. As shown in FIG. 4, for example, each projection 43 can attach to one device mounting bracket flange 46 of the device mounting bracket 24, in which case additional projections 43 can be used for an opposite device mounting bracket flange 46 if necessary. However, it is also possible for a single projection 43 to attach or otherwise operably connect to both device mounting bracket flange 46 of a device mounting bracket 24.

Figure 5:
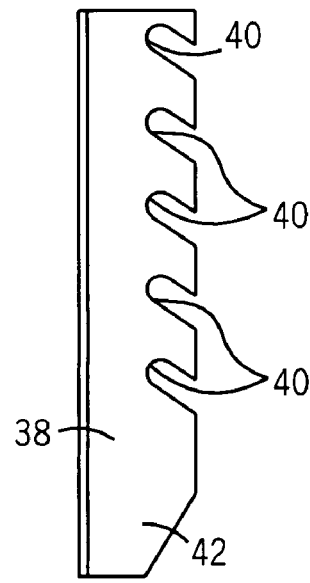
FIG. 5 is a side view of an extension bracket flange intended for use on a lower portion of a device mounting bracket 24.

As shown in FIGS. 1-4, the extension bracket slots 44 are angled upwards moving from an edge of the extension bracket flange 36 towards the center thereof. In this arrangement, when the projections 43 mate with desired extension bracket slots 44, the extension bracket flange 36 "holds" the device mounting bracket 24 in place. FIG. 5 shows a similar arrangement for an example extension bracket flange 36 intended for use on the bottom of the device mounting bracket 24.

The bracket extension mechanisms 38 are used to extend the effective surface length of the device mounting bracket 24 as necessary. In a case where a relatively small and/or lightweight display device is to be mounted, the normal length of the device mounting bracket 24 may be sufficient to enable the device mounting bracket 24 to fully support the device. On the other hand, if a much larger and/or heavier device is to be mounted, a user can locate bracket extension mechanisms 38 on the elongated upper and lower portions 29 and 28 as necessary, creating a longer elongated surface for operably connecting to the back of the device. Additionally, the user is provided with the ability to modify the amount of additional length that is provided by selecting the appropriate extension bracket slots 44 for mating with the projections 43.

Figure 6:
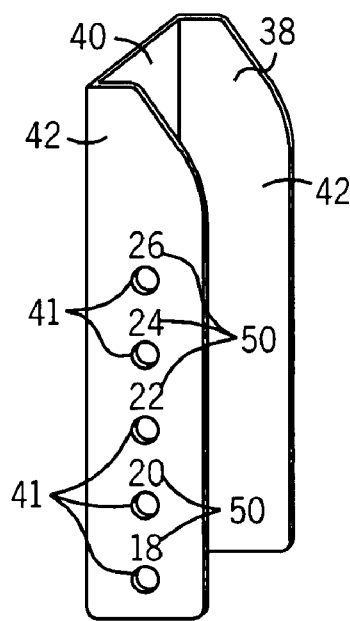
FIG. 6 is a reverse perspective view of a device mounting bracket extension mechanism constructed in accordance with an alternate embodiment of the present invention.

FIG. 6 shows another embodiment of the invention. In FIG. 6, the plurality of extension bracket slots 44 are replaced by extension holes 41 on the bracket extension mechanism 38. The extension holes 41 are sized to accept pins, screws, other types of projections that can also attach to the device mounting bracket 24. It is also possible to use both extension bracket slots 44 and extension holes 41 on the same extension bracket flanges 36 if necessary or desired. In each of these embodiments, it is also possible to include length markers 50, which can aid a user in identifying and selecting the appropriate extension bracket slots 44 to use during the mounting process, as well as ensuring that the same extension bracket slots 44 are used for each bracket extension mechanism 38 in a mounting system 20.

In various embodiments of the invention, the surface mounting bracket 22 is expandable in addition to or instead of the device mounting bracket 24. FIGS. 1 and 10-15 show various versions of such an expandable surface mounting bracket 22. As depicted in these figures, the surface mounting bracket 22 is formed of multiple components which engage and align each other via one of several mechanisms.

Figure 10:
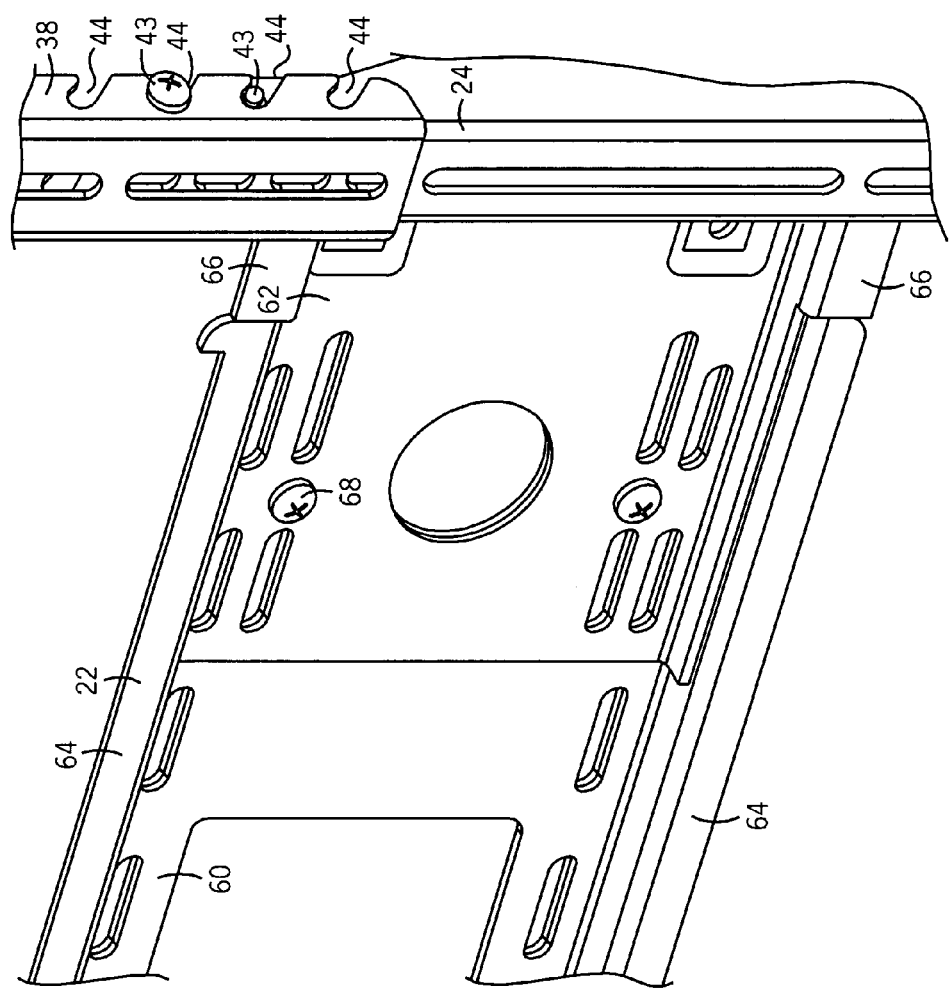
FIG. 10 is a perspective view of a portion of a surface mounting bracket extension mechanism in accordance with FIG. 1.

FIGS. 1 and 10 depict one expandable surface mounting bracket 22 in detail. The expandable surface mounting bracket 22 in this embodiment comprises modules in the form of a central connection portion 60 and a pair of peripheral portions 62 on each side thereof. The central connection portion 60 is configured to slidably engage each of the peripheral portions 62. In the embodiment shown in FIGS. 1 and 10, this is accomplished by having the central connection portion 60 include upper and lower central connection horizontal support members 64 which are partially offset from corresponding peripheral horizontal support members 66 located on each of the peripheral portions 62. As a result, the peripheral portions 62 are capable of being slid in front of (or behind in an alternate embodiment) the central connection portion 60 so that the total longitudinal length of the surface mounting bracket 22 can be adjusted as necessary. Once a desired configuration for the surface mounting bracket 22 has been achieved, surface mounting bracket fasteners 68 such as short screws are used to secure the peripheral portions 62 to the central connection portion 60.

Figure 11:
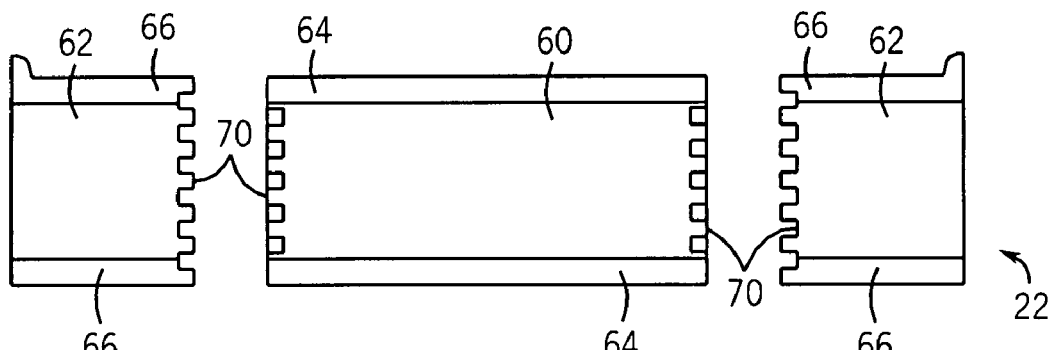
FIG. 11 is a front view of a surface mounting bracket extension mechanism in accordance with one alternative embodiment.
Figure 12:
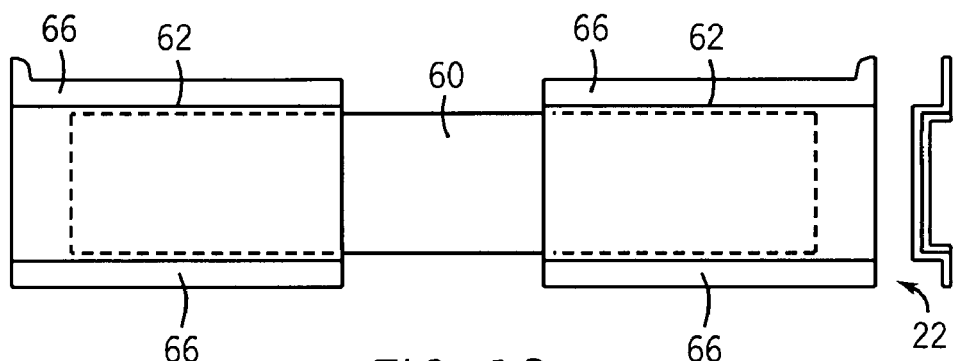
FIG. 12 is a front view of a surface mounting bracket extension mechanism in accordance with another alternative embodiment.

FIGS. 11-15 show various particular embodiments of expandable surface mounting bracket 22. It should be understood, however, that a wide variety of arrangements can be used for the expandable surface mounting bracket 22. FIG. 11 shows an arrangement where the central connection portion 60 and the peripheral portions 62 include interlocking regions 70, which permits these components to mate with each other. In this arrangement, different central connection portions 60 and peripheral portions 62 can be mixed and matched in order to create surface mounting brackets 22 of different sizes. FIG. 12 shows a three-part arrangement that is similar to the arrangement shown in FIGS. 1 and 10. However, the central connection portions 60 in FIG. 12 does not include upper and lower central connection horizontal support members 64. Instead, the central connection portions 60 can fit within a groove or slot on the back of the peripheral portions 62, for example, or simply be placed behind the peripheral portions 62 to achieve a desired arrangement.

Figure 13:
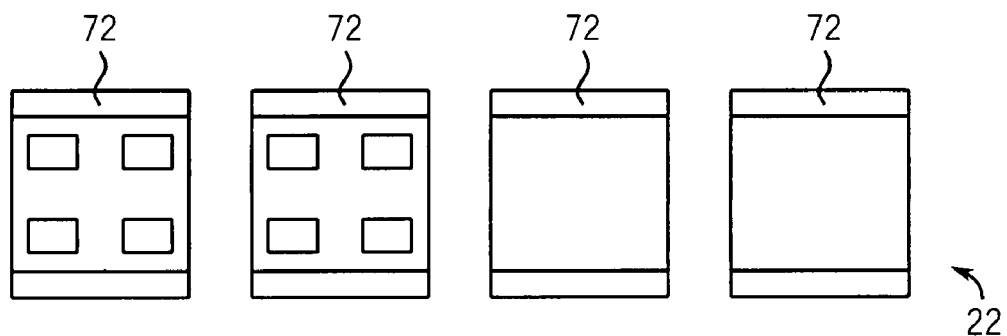
FIG. 13 is a front view of a surface mounting bracket extension mechanism in accordance with yet another alternative embodiment.

FIG. 13 shows yet another embodiment of the surface mounting bracket 22. In this embodiment, it is shown that more than three components may be used. In this particular embodiment, a plurality of identical or different modules 72 may be used in succession, allowing a user to create a surface mounting bracket 22 of virtually any length necessary for a mounting process.

Figure 14:
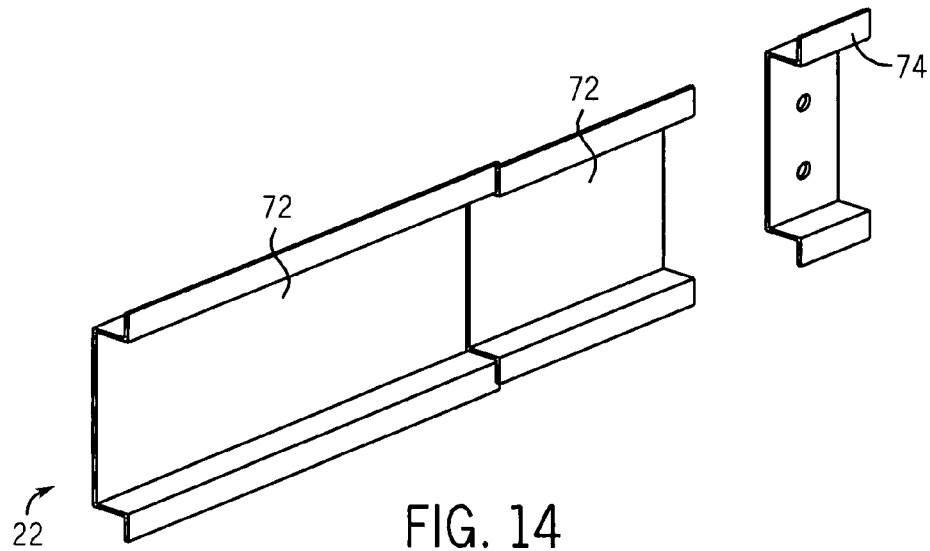
FIG. 14 is a front view of a surface mounting bracket extension mechanism in accordance with still another alternative embodiment.
Figure 15:
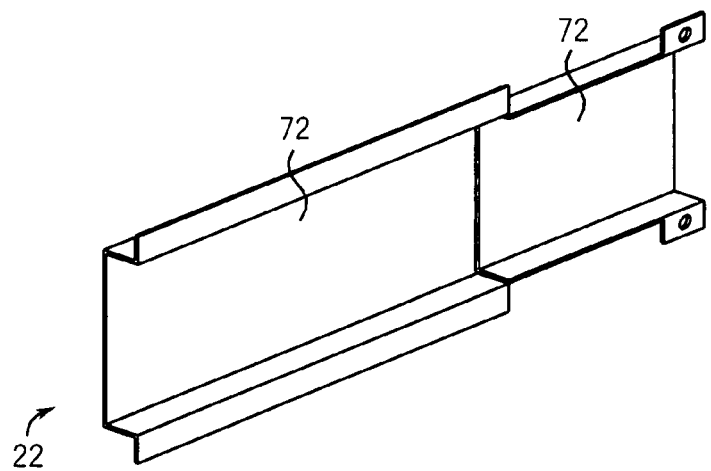
FIG. 15 is a front view of a surface mounting bracket extension mechanism in accordance with another alternative embodiment.

FIGS. 14 and 15 show yet other embodiments of a surface mounting bracket 22, where only two modules 72 are used. In FIG. 14, the two modules 72 slidably engage with each other and are fastened to each other by the use of a connection bracket 74, which slidably engages the modules 72. In FIG. 15, no connection bracket may be necessary.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A system for mounting an audio/visual device, comprising:

a device mounting bracket; and a surface mounting bracket operatively connected to the device mounting bracket and configured to attach to a mounting surface, wherein the device mounting bracket includes at least one device mounting bracket extension mechanism affixable to the device mounting bracket at a plurality of locations to selectively extend the longitudinal length of the device mounting bracket to one of a plurality of predefined longitudinal lengths, the at least one device mounting bracket extension mechanism comprising:

a base portion having a base surface exposed to attach to the audio/visual device, the base surface including at least one device attachment opening extending through the base surface, the base portion configured to attach to the audio/visual device via the at least one device attachment opening, and at least one flange extending toward the mounting surface substantially perpendicular from the base surface and including a plurality of openings therein, the plurality of openings configured to selectively engage with at least one projection associated with the device mounting bracket and extending substantially parallel to the base surface, to establish the predefined longitudinal length of the device mounting bracket, wherein the longitudinal length is orientated substantially parallel to the mounting surface and selectively adjustable to enable longitudinal movement of the at least one device attachment opening, thereby permitting attachment of the audio/visual device that is selectable from a plurality of audio/visual devices of a plurality of dimensions.

2. The system of claim 1, wherein the at least one device mounting bracket extension mechanism comprises a first device mounting bracket extension mechanism affixable to an upper portion of the device mounting bracket at a first plurality of locations and a second device mounting bracket extension mechanism affixable to a lower portion of the device mounting bracket at a second plurality of locations such that a distance between the respective at least one device attachment opening of the first device mounting bracket extension mechanism and the second device mounting bracket extension mechanism is selectively extendable.

3. The system of claim 1, wherein the plurality of openings comprise a plurality of slots formed within the at least one flange.

4. The system of claim 3, wherein the plurality of slots are angled relative to the base surface of the device mounting bracket extension mechanism so as to impede the at least one projection from disengaging a respective slot when the at least one projection is raised.

5. The system of claim 3, wherein the at least one flange comprises two flanges formed substantially parallel to each other.

6. The system of claim 3, wherein the device mounting bracket comprises a device contact bracket including a device contact bracket base and at least one device contact bracket flange extending therefrom, and wherein the at least one device contact bracket flange is configured to accept the at least one projection.

7. The system of claim 1, wherein the surface mounting bracket comprises a plurality of horizontally adjustable modules configured to movably engage each other in a direction substantially perpendicular to the longitudinal length of the device mounting bracket in a plurality of arrangements, permitting a horizontal longitudinal length of the surface mounting bracket to vary.

8. A system for mounting an audio/visual device, comprising:
  a first device mounting bracket and a second device mounting bracket, each of the first device mounting bracket and the second device mounting bracket characterized by a substantially vertical longitudinal axis and configured to attach to the audio/visual device via a plurality device attachment openings through the respective first and second device mounting brackets, each of the first device mounting bracket and the second device mounting bracket comprising:
    a device contact bracket; and
    at least one vertically adjustable device extension bracket, the at least one vertically adjustable device extension bracket configured to attach to the respective device mounting bracket in one of a plurality of positions relative thereto, permitting a longitudinal length of the respective device mounting bracket to vary along the substantially vertical longitudinal axis; and
  a surface mounting bracket operatively connected to the first device mounting bracket and the second device mounting bracket and configured to attach to a surface, the surface mounting bracket, possessing a selectively adjustable horizontal longitudinal length and comprising a plurality of modules slidably engageable with each other, at least one of the plurality of modules including an upper engagement member horizontally disposed along a length of the at least one module and a lower engagement member substantially parallel to the upper engagement member, the lower engagement member and the upper engagement member slidingly mateable with another of the plurality of modules adjacent to the at least one module, permitting the horizontal longitudinal length of the surface mounting bracket to vary, and thereby varying a horizontal distance between the first device mounting bracket and the second device mounting bracket.

9. The system of claim 8, wherein each of the plurality of modules includes a lower engagement member and an upper engagement member, and wherein the respective lower engagement members and the respective upper engagement members of adjacent modules of the plurality of modules are slidingly mateable.

10. The system of claim 8, wherein the plurality of modules comprises four modules.

11. The system of claim 8, wherein the plurality of modules comprises:
  a central connection portion; and
  at least one peripheral portion slidably adjustable with the central connection portion along the horizontal longitudinal axis of the surface mounting bracket.

12. The system of claim 8, wherein the plurality of modules are configured to interlock with each other along an axis substantially perpendicular to the horizontal longitudinal length.

13. A system for mounting an audio/visual device, comprising:
  a device mounting bracket configured to attach to an item and having a device mounting bracket longitudinal length adjustable along a first axis, the device mounting bracket including at least one device mounting bracket extension mechanism comprising:
    a base, and
    at least one flange extending from the base and including a plurality of openings therein, the plurality of openings extending from the edge of the flange toward the base, at least one of the plurality of openings configured to selectively engage with at least one projection associated with the device mounting bracket in one of a plurality of positions; and
  a surface mounting bracket operatively connected to the device mounting bracket and configured to attach to a surface, the surface mounting bracket possessing a surface mounting bracket longitudinal length, the surface mounting bracket comprising a plurality of modules slidably engageable with each other, permitting the surface mounting bracket longitudinal length to vary along a second axis substantially perpendicular to the first axis,
  wherein the device mounting bracket possesses an adjustable device mounting bracket longitudinal length based upon the at least one of the plurality of openings which selectively engages the at least one projection.

14. The system of claim 13, wherein the plurality of modules comprises:
  a central connection portion; and
  at least one peripheral portion slidably engageable with the central connection portion along the longitudinal axis of the surface mounting bracket.

15. The system of claim 14, wherein the plurality of modules are configured to interlock with each other along an axis substantially perpendicular to the longitudinal length.

16. The system of claim 13, wherein the plurality of openings comprise a plurality of angled slots formed within the at least one flange relative to a longitudinal surface of the device mounting bracket, each of the plurality of angled slots defining a predefined device mounting bracket longitudinal length, wherein the angled slots impede the at least one projection from disengaging a respective slot when the at least one projection is raised.

17. The system of claim 13, wherein the device mounting bracket comprises a device contact bracket including a device contact bracket base and at least one device contact bracket flange extending therefrom, and wherein the at least one device contact bracket flange is configured to accept the at least one projection.

18. The system of claim 13, wherein the device mounting bracket is selectively moveable relative to the surface mounting bracket.

19. A system for mounting an audio/visual device, comprising:

a device mounting bracket including an upper device mounting bracket extension mechanism affixable to an upper portion of the device mounting bracket at a first plurality of locations, and a lower device mounting bracket extension mechanism affixable to a lower portion of the device mounting bracket at a second plurality of locations such that the upper device bracket extension mechanism and the lower device bracket extension mechanism selectively extend the longitudinal length of the device mounting bracket to one of a plurality of predefined longitudinal lengths, each of the upper device mounting bracket extension mechanism and the lower device mounting bracket extension mechanism comprising;

a base portion having a base surface exposed to attach to the audio/visual device, the base surface including at least one device attachment opening extending through the base surface, the base portion configured to attach to the audio/visual device via the at least one device attachment opening, and at least one flange extending toward the mounting surface substantially perpendicular from the base surface and including a plurality of openings therein, the plurality of openings configured to selectively engage with at least one projection associated with the device mounting bracket and extending substantially parallel to the base surface, to establish the predefined longitudinal length of the device mounting bracket; and a surface mounting bracket operatively connected to the device mounting bracket and configured to attach to a mounting surface, wherein the longitudinal length is selectively adjustable such that a distance between the respective at least one device attachment opening of the upper device mounting bracket extension mechanism and the lower device mounting bracket extension mechanism is selectively extendable.

* * * * *